(12) United States Patent
Reudink et al.

(10) Patent No.: US 6,363,263 B1
(45) Date of Patent: *Mar. 26, 2002

(54) UNIVERSAL WIDEBAND SWITCHLESS CHANNEL SELECTOR

(75) Inventors: Mark Reudink, Bellevue; Curt Peterson, Mercer Island; Douglas O. Reudink, Bellevue, all of WA (US)

(73) Assignee: Metawave Communications Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,170

(22) Filed: Jul. 15, 1997

(51) Int. Cl.[7] .................................................. H04B 1/38
(52) U.S. Cl. ........................ 455/562; 455/424; 455/62; 455/63; 370/334; 370/480
(58) Field of Search ............................... 455/562, 33.1, 455/63, 64, 523, 524, 25, 446, 447, 101, 449, 507; 370/480, 334, 335, 339, 340

(56) References Cited

U.S. PATENT DOCUMENTS

| | | | | |
|---|---|---|---|---|
| 4,211,894 A | * | 7/1980 | Watanabe et al. ............ 370/339 |
| 5,048,116 A | * | 9/1991 | Schaeffer ..................... 455/562 |
| 5,488,737 A | * | 1/1996 | Harbin et al. ............... 455/33.1 |
| 5,590,399 A | * | 12/1996 | Matsumoto et al. ......... 455/449 |
| 5,648,968 A | * | 7/1997 | Reudink ...................... 370/335 |
| 5,771,439 A | * | 6/1998 | Kennedy, Jr. et al. ........ 455/63 |
| 5,806,001 A | * | 9/1998 | Yokota ........................ 455/507 |
| 5,819,182 A | * | 10/1998 | Gardner et al. ............. 455/524 |
| 5,848,361 A | * | 12/1998 | Edwards ..................... 455/562 |
| 5,854,986 A | * | 12/1998 | Dorren et al. ............... 455/562 |
| 5,987,037 A | * | 11/1999 | Gans .......................... 370/480 |
| 5,859,854 A | * | 12/1999 | Reudink ...................... 370/480 |
| 6,055,230 A | * | 4/2000 | Feuerstein et al. .......... 370/335 |
| 6,154,501 A | * | 11/2000 | Friedman .................... 375/260 |
| 6,169,451 B1 | * | 1/2001 | Kim ........................ 330/124 D |

* cited by examiner

Primary Examiner—Dwayne Bost
Assistant Examiner—Charles Craver
(74) Attorney, Agent, or Firm—Fulbright & Jaworski L.L.P.

(57) ABSTRACT

A system and method for providing a particular wireless communication signal appearing within an antenna beam to a cellular base station to the exclusion of other communication signals also appearing within the antenna beam is disclosed. Preferably multiple narrow antenna beams are utilized to target a communication unit sourcing the particular communication signal. Signals provided by these multiple narrow beams are filtered to exclude undesired communication signals appearing therein and then are provided to select inputs of the cellular base station. Preferably the system of the disclosed invention is adapted to substantially universally couple to various cellular base station configurations.

65 Claims, 4 Drawing Sheets

UNIVERSAL WIDEBAND SWITCHLESS CHANNEL SELECTOR

RELATED APPLICATIONS

Reference is hereby made to the following co-pending and commonly assigned U.S. Patent applications: APPARATUS, SYSTEMS AND METHODS FOR MULTIPLE ANTENNA TRANSMISSION IN WIRELESS COMMUNICATIONS SYSTEMS, Ser. No. 08/520,316, now U.S. Pat. No. 5,648,960; METHOD AND APPARATUS FOR IMPROVED CONTROL OVER CELLULAR SYSTEMS, Ser. No. 08/582,525, now U.S. Pat. No. 5,884,147; SYSTEM AND METHOD FOR CELLULAR BEAM SPECTRUM MANAGEMENT, Ser. No. 08/651,981, now U.S. Pat. No. 5,745,841; and CONICAL OMNI-DIRECTIONAL COVERAGE MULTIPLE-BEAM ANTENNA WITH MULTIPLE FEED NETWORK, Ser. No. 08/808,304; the disclosures of which applications are incorporated herein by reference.

TECHNICAL FIELD OF THE INVENTION

The present invention relates in general to wireless communication systems and, more particularly, to systems and methods for improving signal quality by providing select signals to a wireless communication system.

BACKGROUND OF THE INVENTION

As originally implemented, cellular communications systems were broken down into omni-trunks where each cell was able to use each channel in a 360° radius. Because of overlap in the area serviced by cells, a caller utilizing one cell in the penumbra between two cells could interfere with a caller utilizing the other cell if both were on the same channel. To avoid this interference the channel utilized by a caller in one cell would have to be disabled for any other callers in any adjacent cells. Disabling such a channel on all adjacent cells would cause many more cells than actually utilized to have the caller's channel unavailable for use by other callers. Such disabling of channels to avoid interference was recognized to lead to under-utilization of cell resources as well as depletion of available channels.

One solution to reduce the interference problems caused by other users in the omni-trunk 360° configuration, has been to break down cells into 120° sectors such that each channel available at the cell only communicates in an area of 120° radial coverage about the cell. Through the use of such sectors, mobile units operating within an adjacent cell or the same cell, but within a different sector, may utilize a different communication channel and, therefore, substantially avoid interfering with other callers in the cell.

A problem with going from the omni-trunk 360° configuration to the sector system, however, is that as a result of splitting of the cell into 120° sectors only a third of the channels are available in each sector. This results in a reduced call capacity in any particular cell sector as compared to that available in the omni-trunk 360° configuration.

In order to maintain call capacity throughout the cell, other solutions to these interference problems have included the use of so called "smart antennas," or switchbeam systems, providing multiple antenna beams throughout the cells. Systems implementing multiple antenna beams, such as twelve narrow beams, are described in U.S. Pat. No. 5,563,610, entitled "NARROW BEAM ANTENNA SYSTEM WITH ANGULAR DIVERSITY," incorporated herein by reference, and the associated above-referenced co-pending and commonly assigned continuation-in-part U.S. Patent application entitled "APPARATUS, SYSTEMS AND METHODS FOR MULTIPLE ANTENNA TRANSMISSION IN WIRELESS COMMUNICATIONS SYSTEMS."

In such systems, a controller is operable to determine a narrow beam upon which a mobile is operating and couple that beam's signal to the proper communication input at the base transceiver station (BTS). Therefore, the smart antenna system is able to target particular mobile units to the exclusion of others and, as a result, reduce interference caused by the mobile units not targeted. However, the ability to mitigate interference in such systems as they exist today is limited by the fact that selection of a beam for a certain channel not only provides that channel to the BTS radio, but all channels on that beam are also sent down to the BTS radio. This problem is compounded in digital systems where the same channel may be utilized on multiple beams and, thus, have increased opportunity for interfering signals to appear within the selected beams. Therefore, the amount of interference rejection that is obtained, in either an analogue or digital implementation, is not as great as could be if only the channel that was desired was sent to the radio.

Moreover, although typically providing improved signal quality over the 360° omni-trunk configuration, both the sectored and smart antenna systems have their drawbacks to implementation. For example, since its introduction for use by the general public in the early 1980's, mobile communications utilizing cellular telephone technology has experienced phenomenal growth. This growth has resulted in a vast base of existing BTS sites already installed and equipped throughout many cellular service areas. These BTS sites may be equipped with any number of different technologies, such as the omni-trunk, sectored cell, or smart antenna, discussed above.

In order to improve signal quality at existing BTS sites, installed without the benefit of recent communication technology improvements, it would be advantageous to provide a reduction in interference, such as through the use of the solutions above. However, the above mentioned solutions require extensive modification to existing BTS sites in order to be implemented. For example the three sectored system typically requires the addition of radio units to individually process the signals associated with the three sectors in addition to replacing the existing antenna structure. Similarly, the smart antenna typically requires modifications at the BTS site, such as usurping the operation of existing equipment, in addition to replacing the existing antenna structure in order to function properly.

The necessity to add communication equipment to provide additional functionality or in order to usurp existing functionality causes there to be a cost barrier with respect to equipping existing BTS sites with such improved technology. Moreover, as there are a plethora of different manufacturers and configurations of existing equipment, the upgrade equipment must typically be specially configured or adapted in order to upgrade a particular BTS site configuration.

Therefore, a need exists in the art for an air interface system and method which is adaptable to existing wireless communication hardware in order to provide improved signal quality at existing BTS sites.

A further need exists in the art for an air interface system and method which is universally adaptable to a variety of existing wireless communication hardware such that its installation on different configurations of systems requires little or no modification.

A still further need exists in the art for an air interface system and method which, when coupled with existing wireless communication equipment, provides improved signal quality while replacing or usurping a minimum of existing hardware.

SUMMARY OF THE INVENTION

These and other objects, needs and desires are obtained in a system and method utilizing an air interface controller to provide select signals appearing within the radiation pattern of cell to communication equipment associated with an existing BTS site. Through the provision of only select signals to the inputs of the BTS communication equipment, the present invention is capable of targeting particular mobile units to the exclusion of other mobile units. This provides for improved signal quality as the number of potential interfering signals is reduced.

Preferably, the air interface controller of the present invention provides the select signals to the exclusion of others through the use of adjustable filters. As the air interface controller determines which signals are to be provided to the communication equipment, a filter in the signal path is adjusted or selected to allow the associated frequency band, or channel, to pass.

Preferably, the air interface controller monitors the BTS in order to determine which signals are to be provided to the BTS. For example, the air interface controller may intercept BTS scan receiver commands in order to determine what communication channels to pass, through the use of the above mentioned filtering, to the BTS. It shall be appreciated that, by utilizing information already available at the BTS in order to make its determination of what signals to pass, the present invention does not require duplication or usurpation of the existing BTS control systems. Furthermore, by simply requiring connection to already existing, commonly available, control signals, rather than usurping various control systems, the present invention does not require significant modification to couple with a variety of existing BTS sites. Therefore, the present invention is a true applique that may simply be added to a previously existing BTS in order to improve signal quality.

Furthermore, the air interface controller of the present invention includes a minimum amount of hardware, and is thus cost effective to implement. This, combined with the fact that the air interface controller is an applique, results in an apparatus uniquely suited for retrofitting BTS sites already in place. Therefore, a technical advantage of the present invention is to provide a convenient means by which signal quality may be improved at existing BTS sites through the addition of an upgrade applique to existing hardware.

It shall be appreciated that the use of the signal filtering described above is advantageous in reducing interference, even at an omni-trunk cell, as only signals of interest are allowed to pass to the BTS. However, by definition, each of the communication channels associated with these signals of interest are communicated throughout the omni-trunk cell.

Therefore, to provide the additional benefits associated with antenna beams targeting select mobile units to the exclusion of others, a preferred embodiment of the present invention utilizes multiple narrow beams. An aerial structure adapted to provide multiple narrow beams and their associated signals is described in the above-referenced co-pending and commonly assigned U.S. patent application entitled "CONICAL OMNI-DIRECTIONAL COVERAGE MULTIPLE-BEAM ANTENNA WITH MULTIPLE FEED NETWORK." Of course, either adaptive arrays or fixed multi-beam arrays could be utilized by the present invention.

This embodiment of the present invention determines which signals should be passed to the BTS, and then determines the beams having the most desirable signal (i.e., strongest received signal, best signal to noise ratio, highest carrier to interference ratio, etc.) with respect to the signal of interest. Upon making this determination, the air interface controller adjusts a filter in the signal path associated with these select beams to allow the frequency band associated with the signal of interest to pass. As such, the air interface controller filters signals appearing within the antenna beam, on a per beam basis, such that only the channels that should be allowed to travel to the radio for a specific beam are allowed to do so.

The purpose of the air interface controller selecting from among beams upon which the signal of interest appears is to provide the BTS with the signals of interest with the best signal possible. This removes the excess interference that is caused by a signal, which may be present on an adjacent beam but is not strong enough to be helpful to the desired signal on the first beam, which may cause interference to a second channel on the adjacent beam.

For example, the present invention may select the two beams having the strongest signal with respect to a signal of interest. The filters provided in the signal paths of these two beams may then be adjusted to pass the communication channel associated with this signal of interest. All the remaining beams would be essentially shut off with respect to this signal of interest. This way, not only are mobile units operating outside these two beams excluded, but so to are mobile units operating on different communication channels within these beams. Likewise, this signal is removed from other beams which may be utilized to service other communication units.

It shall be appreciated that, although a sectored or typical smart antenna system may select a beam or sector having a best attribute with respect to a signal of interest, generally these systems pass all signals present within the beam signal to the BTS communication equipment. There are typically signals in addition to the signal of interest appearing within the antenna beam signal which, when allowed to pass to the communication equipment, may cause interference with the signal of interest. Such interference may be in the form of cross channel or co-channel interference or may be in the form of reducing the signal to noise ratio or carrier to interference ratio.

As with the previously described embodiment, this embodiment preferably monitors the BTS in order to determine which signals are to be provided to the BTS. Utilization of such information already available at the BTS, in order to make its determination of what signals to pass, does not require duplication or usurpation of the existing BTS control systems. Such connection to already existing, commonly available, control signals, also does not require substantial modification to couple with a variety of existing BTS sites. Therefore, this embodiment of the present invention is an appliqué that may simply be added to a previously existing BTS in order to improve signal quality.

As such, the multiple beams of the present invention are essentially compressed down to 2 beams and interfaced into the cell site BTS. Therefore, instead of having a switch matrix of any sort, the interference rejection is accomplished through the filtering of each of the multiple antenna beams which are then summed together and allowed to pass to the cell site. Using this method, the application is completely transparent to the cell site. This provides equipment that, although not specifically manufactured for a particular BTS configuration, any cell site containing two inputs for an omni or six inputs for a sector can easily utilize to obtain greater capacity and interference reduction.

However, it shall be appreciated that in order to provide multiple narrow beams at a cell previously having only an omni-trunk, or even a typical sectored, configuration, this embodiment replaces the existing aerial structure. Therefore, although being an appliqué coupled to the BTS, this embodiment does not interface between existing antenna structure and communication equipment as the previously described embodiment, but rather attaches to the BTS and replaces the existing aerial structure. Of course, where a multi-beam aerial structure exists, the present invention may utilize such without the need to replace the structure.

A technical advantage is realized by the present invention in its ability to improve the signal quality at any type of BTS. Specifically, by providing only signals of interest to the BTS communication equipment through the use of filters, the present invention is able to improve signal quality. This signal improvement may be further enhanced through the use of interference cancellation accomplished by removing interfering signals from the signal of interest. Moreover, through the use of multiple beam antenna structure, the present invention is further able to improve signal quality through selection of beams providing the most desirable signals of interest.

A further technical advantage of the present invention is improved signal quality over a typical multi-beam antenna system as the adjustable filters are utilized to select only the signals of interest on the antenna beam signals passed to the BTS communication equipment to the exclusion of other signals appearing therein. As such not only are mobile units operating outside a particular antenna beam excluded, but so to are mobile units operating on other channels within the beam.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Although the present invention is discussed herein with respect to cellular communications, it shall be appreciated that the advantages may be realized on any wireless communication system. Therefore, it shall be understood that the present invention is not limited to cellular communication systems, and is useful in improving wireless communication signal quality in general.

Figure 1:
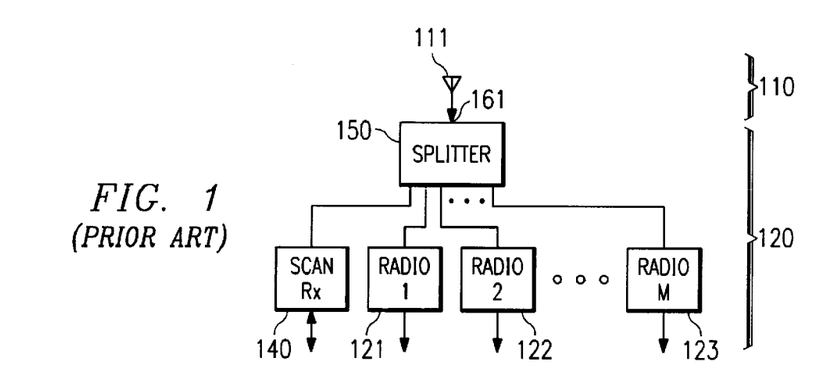
FIG. 1 illustrates a typical prior art omni-trunk system.
Figure 2:
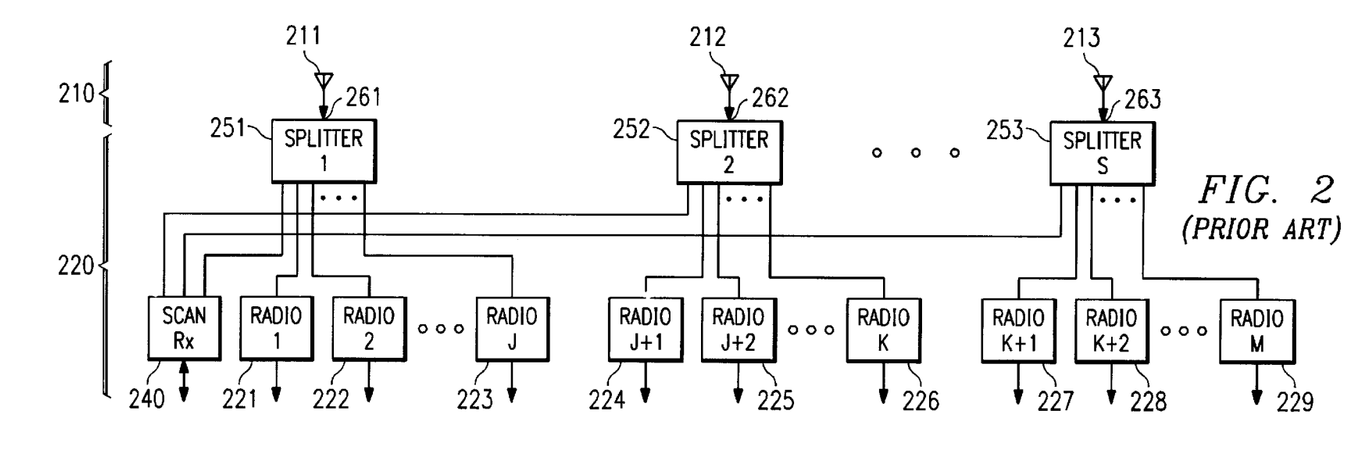
FIG. 2 illustrates a typical prior art sectored system.
Figure 3:
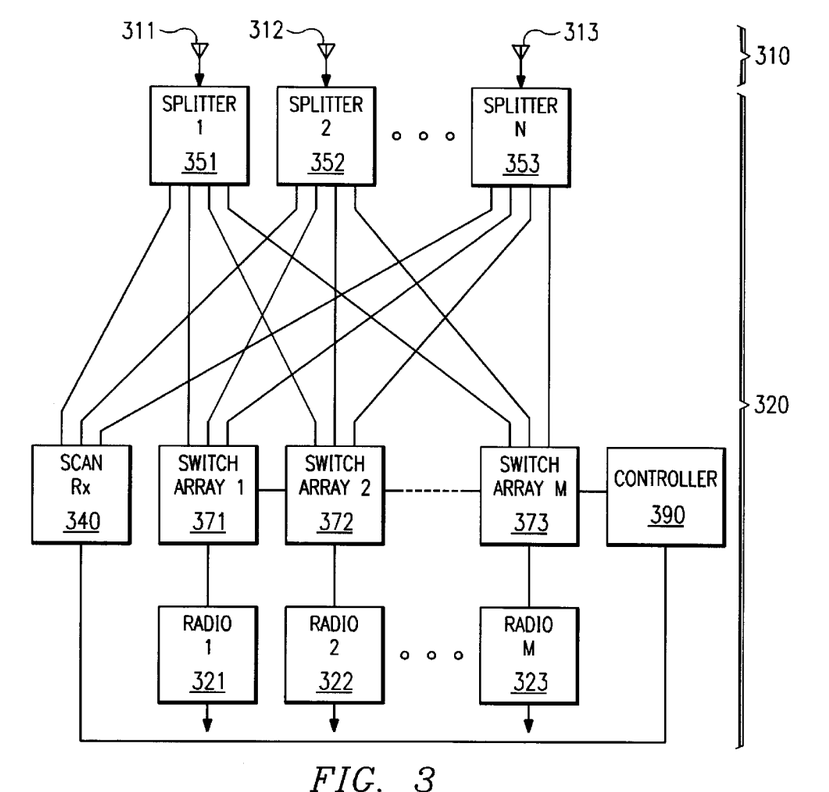
FIG. 3 illustrates a system providing signals from a multi-beam antenna system to a sectored system.

Although the discussion herein refers to radios having a single signal input, it shall be appreciated that the concepts described apply to multiple input radios such as those utilizing a sector and diversity input port. For example, the radios of FIGS. 1, 2 and 3 are shown having a single input, however they may utilize multiple signal inputs in order to improve signal quality through signal diversity. Such systems utilizing signal diversity typically include multiple antennas, each being adapted to communicate signals having a different attribute; i.e., phase differences associated with antennas disposed to be spatially diverse. Such systems may be illustrated by including an additional antenna and its associated signal path circuitry (in FIGS. 1 and 2 a splitter, and in FIG. 3 a splitter and switch array for each antenna beam) to provide a diverse signal at a second input of each radio.

In order to simplify the concepts involved with the present invention, circuitry to provide signal diversity is not shown. However, it shall be appreciated that the invention discussed herein is suitable for use in systems utilizing signal diversity and, therefore, is intended for use in such systems.

Directing attention to FIG. 1, a typical implementation at a BTS site may be seen. Here antenna structure 110 including antenna 111 provides an antenna beam signal to BTS communication equipment 120. Splitter 150 of BTS communication equipment 120 provides the antenna beam signal to various components of the BTS equipment such as scan receiver 140 and radios 121 through 123.

It shall be appreciated that BTS equipment may include M radios adapted to communicate the different communications channels available at the BTS site between antenna structure 110 and other equipment (not shown) such as a base station controller (BSC) or mobile switching office (MSO). Scan receiver 140 searches through the channels utilized by the BTS to make determinations as to signal strength etcetera used in call management functions such as handoff and/or channel assignment.

As shown in FIG. 1, any signal appearing within the antenna beam of antenna 111 is provided to each of the radios 121 through 123. This causes each radio to have to discriminate its signal of interest from any number of other signals which may appear within the antenna beam. These other signals will most certainly include the signals intended for the other radios of the BTS site. Moreover, where antenna 111 is an omni directional antenna, such as is associated with an omni-trunk configuration, the interfering signals may include a litany of other foreign signals.

One prior art solution to paring down the number of potential interfering signals has been to utilize a sectored system. Using sectors, an antenna beam having a view of less than the full area serviced by the BTS site provides a signal to the radios associated with that sector. Due to the fact that the sectored antenna beam has a reduced area of coverage, fewer interfering signals are provided to the radios of the BTS.

Directing attention to FIG. 2, a three sectored system utilizing substantially the same configuration as that of FIG. 1 is shown. Here antenna structure 210 includes antennas 211 through 213, each associated with a different sector of the BTS site. Each antenna provides an antenna beam signal to an associated splitter, represented as splitters 251 through 253 of BTS communication equipment 220. Each splitter provides its associated antenna beam signal to various components of the BTS equipment such as scan receiver 240 and its associated radios; represented here as radios 221 through 223 for splitter 251, radios 224 through 226 for splitter 252, and radios 227 through 229 for splitter 253.

In addition to the functions discussed above with respect to scan receiver 140, scan receiver 240 searches through the channels utilized by the BTS to make determinations as to signal strength etcetera used in assigning a call to a sector of the BTS. In order to determine the sector having the desired attribute with respect to a particular signal, scan receiver 240 is adapted to identify the sector in which a particular signal is received.

It shall be appreciated that, although the BTS equipment includes M radios associated with the different communications channels available at the BTS site, each sector includes only a subset of such radios. As such only a portion of the communications channels are available within any one sector of the sectored BTS. This limits capacity within a sector as only a subset of the total channels are available within the area serviced by a particular sector.

A solution to the capacity problem introduced by the sectored system of FIG. 2 is the use of a smart antenna system providing multiple narrow beams. Here any communication channel may be made available at any beam. As such, a mobile unit operating on a particular channel may be targeted to the exclusion of others by providing only an antenna beam signal in which it is operating to a radio adapted for that channel. Because the antenna beam is narrow, other, potentially interfering, signals are eliminated from the signal provided to the radio. Thus, improved signal quality may be realized without the disadvantages of reducing call capacity within predetermined portions of the service area.

Directing attention to FIG. 3, a possible implementation of a multiple narrow beam antenna system is illustrated. Here antenna structure 310 includes antennas 311 through 313, each associated with a different narrow beam. Of course, antenna structure 310 may be a single multiple beam antenna rather than individual antennas as illustrated in FIG. 3.

Each antenna provides an antenna beam signal to an associated splitter, represented as splitters 351 through 353 of BTS communication equipment 320. Each splitter provides its associated antenna beam signal to the various components of the BTS equipment such as scan receiver 340 and its associated switch array; represented here as switch arrays 371 through 373. These switch arrays provide for the coupling of any antenna beam signal to any radio of the BTS, shown as radios 321 through 323.

Switching of the switching arrays to couple a desired antenna beam signal to a particular radio is controlled by controller 390. This controller operates from information regarding signal attributes as determined by scan receiver 340. Controller 390 may also operate based on information provided from a central control authority such as a BSC or MSO.

Although performing substantially the functions discussed above with respect to scan receiver 140 and 240, scan receiver 340 is adapted to identify the antenna beam in which a particular signal is received. This is necessary in order to assign only a particular beam providing a best signal of interest to a particular radio. As such, the scan receiver is considerably different than that of the omni-trunk and sectored systems discussed above.

From a review of FIG. 3 and the above discussion, it is apparent that the multi-beam system is very different than both the omni-trunk and sectored systems discussed above. Not only is the antenna structure 310 very different than antenna structure 110 and 210, but so to is the circuitry interconnecting this antenna structure to BTS communication equipment 320. This architecture requires removal of a large majority of current installed cellular equipment which is not necessarily a cost effective solution. It should therefore be appreciated that adapting an omni-trunk or sectored system, such as illustrated in FIGS. 1 and 2, to utilize the multi-beam system of FIG. 3 would require substantial modification. Moreover, there exists a number of currently existing technologies such as TDMA, CDMA, and various analog technologies each presenting their own interface challenges.

Therefore, a preferred embodiment of the present invention provides a multi-beam antenna structure which may be coupled to the omni-trunk or sectored systems of FIGS. 1 and 2 through the use of a universal air interface controller. Preferably, the air interface controller couples to the existing BTS communication equipment with a minimum of components being bypassed. This provides for not only a cost effective appliqué, but provides a system which may easily, and transparently, couple to existing systems.

In a preferred embodiment, the air interface controller couples to the BTS communication equipment so as to utilize all the existing BTS communication equipment. For example, the air interface controller may couple to the omni-trunk system at input 161 of BTS communication equipment 120 of FIG. 1 or inputs 261 through 263 of BTS communication equipment 220 of FIG. 2 and thus utilize the BTS communication equipment.

Figure 4:
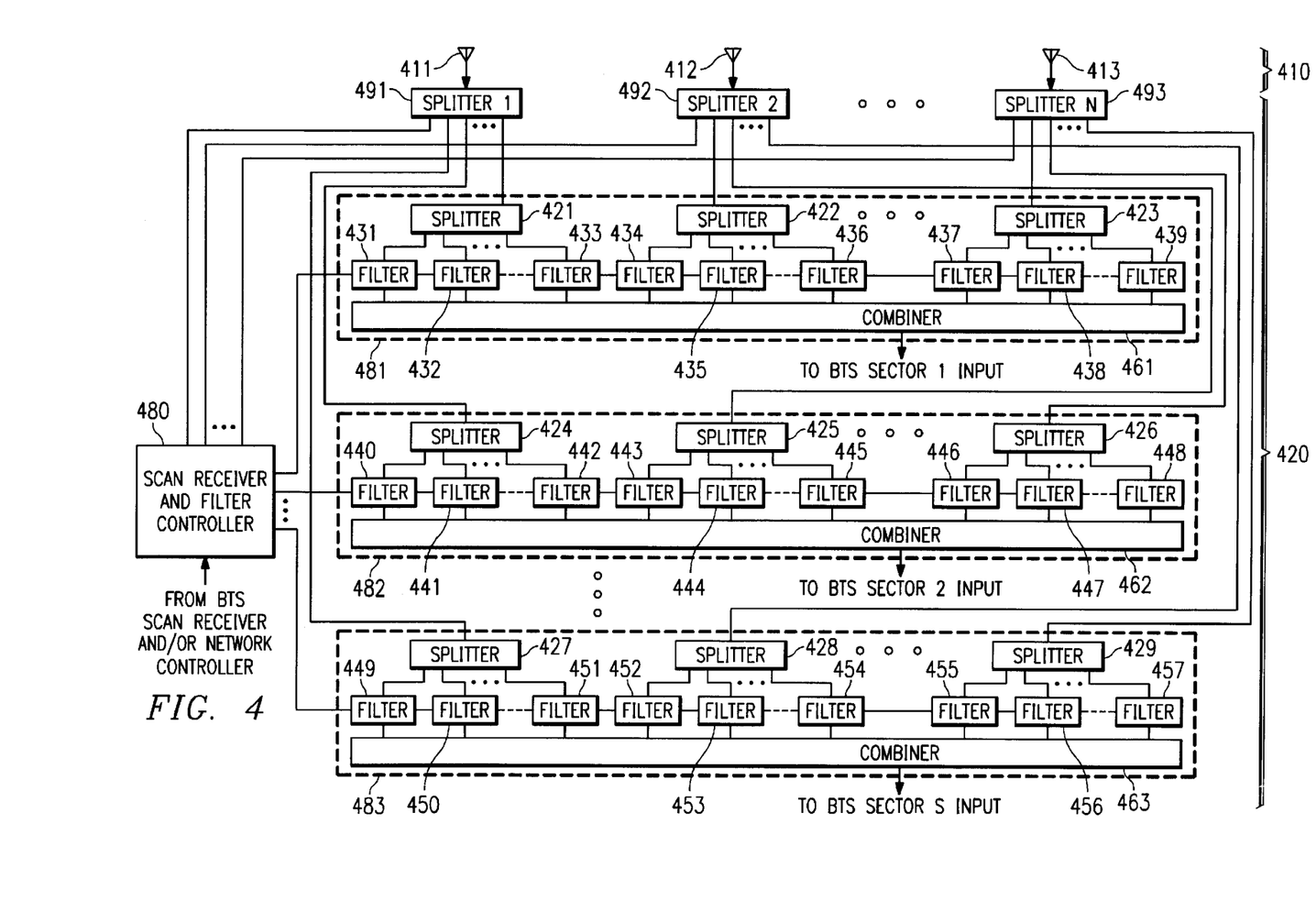
FIG. 4 illustrates a preferred embodiment of the air interface controller of the present invention adapted to provide signals from a multi-beam antenna system to a sectored system.

Directing attention to FIG. 4, a preferred embodiment of the present invention is shown. Here antenna structure 410 and circuitry (hereinafter "air interface controller") 420 are adapted to couple to a sectored BTS.

It shall be appreciated that antenna structure 410 (illustrated here as individual antennas 411 through 413 although a single multi-beam antenna may be used) includes N antenna beams. These antenna beams are preferably substantially non-overlapping narrow beams as discussed hereinbefore. One such aerial structure adapted to provide multiple narrow beams and their associated signals is described in the above-referenced co-pending and commonly assigned U.S. patent application entitled "CONICAL OMNI-DIRECTIONAL COVERAGE MULTIPLE-BEAM ANTENNA WITH MULTIPLE FEED NETWORK," incorporated herein by reference.

Air interface controller 420 includes circuitry, sector circuitry 481 through 483, associated with each input of the BTS equipment to which it is to be coupled. For example splitters 421 through 423, filters 431 through 439, and combiner 461 of sector circuitry 481 are associated with a first input of the BTS equipment. Likewise, splitters 424 through 426, filters 440 through 448, and combiner 462 of sector circuitry 482 are associated with a second input of the BTS equipment. The number of sector circuits included in the present invention "S" may be any number of inputs utilized by the BTS equipment.

Typically the inputs of the BTS equipment associated with the sector circuitry of the present invention will be inputs associated with the sectors of the BTS. However, as discussed hereinbelow, there is no limitation to the outputs of combiners 461 through 463 providing signals to a sectored BTS.

Additionally, it shall be appreciated that the present invention may be utilized to provide diverse signals, such as those typically provided to the sector and diversity inputs of a sectored BTS. Where such diversity inputs are utilized, the present invention includes sector circuitry sufficient to provide each of these inputs with a signal according to the present invention. For example, where each sector of a three sectored BTS includes both a sector and diversity input, the number of sector circuits S would equal six (three sectors times two inputs each).

Of course, where signal diversity is used, scan receiver and filter controller 480 include instructions in order to provide the proper signals to each sector and diversity port. For example, a beam signal having the strongest signal with respect to a particular communication channel may be provided to a signal port of a first sector while a beam signal having the next strongest signal with respect to this communication channel is provided to a diversity port of the first sector.

Splitters 491 through 493, each associated with an antenna beam of the antenna structure, provides its associated antenna beam signal to each of the sector circuits as well as scan receiver and filter controller 480. Therefore, splitters 491 through 493 split each beam signal at least S+1 ways.

Each sector circuit includes circuitry associated with each beam signal. For example, sector circuit 481 includes splitter 421 and filters 431 through 433 associated with antenna beam 411. Likewise, sector circuit 481 includes splitter 422 and filters 434 through 436 associated with antenna beam 412.

Preferably, the filters associated with each beam signal include filters for each communication channel available at the BTS site in order to enable providing the signal of any communication channel to the BTS through any of the antenna beams. For example, filters 431 through 433, 440 through 442, and 449 through 451, associated with the beam signal of antenna 411 provide band pass filtering for each of the communication frequencies utilized by the radios of the coupled BTS; i.e., where air interface controller 420 is coupled to BTS equipment 220 of FIG. 2, filters 431 through 433, 440 through 442, and 449 through 451 provide band pass filtering for each communication channel utilized by radios 221 through 229.

The filters of air interface controller 420 may be adjustable filters suitable for adaptively allowing any communication channel to pass. The filtering mechanism could be a number of classical RF analog filters such as saw filters, helical resonators, strip line or DSP technology.

Appreciating that mobile users will typically be distributed throughout a particular service area, and thus communicating within multiple beams, the number of such adjustable filters associated with the circuitry of each sector circuit associated with each beam signal may be fewer than the total number of communication channels utilized by the BTS site.

For example, where a total of M communications channels are utilized at a BTS site, typically some number of mobile units less than M will be operating within any one antenna beam. Therefore, a number of adjustable filters associated with any particular beam may be less than M.

Of course, where digital communication is employed, such as through the use of time division multiple access (TDMA) or code division multiple access (CDMA), more than one mobile may operate on a single communication channel. Therefore, depending on usage patterns, the number of filters necessary in a digital system to adequately service all signals detectable within a particular beam may be increased over those necessary in an analogue system.

The adjustable filters of the air interface controller are adjusted to allow a particular communication channel to pass or, if for example there are fewer communication channels in use within a particular antenna beam, the filters may be adjusted to allow no signals to pass; i.e., "switch" off by stopping all frequencies from passing. Adjusting of the filters is preferably controlled by scan receiver and filter controller 480.

It shall be appreciated that the adjustable filters of the present invention provide for the "switchable" connection of select signals to particular BTS equipment without the need for switch arrays such as shown in FIG. 3. Moreover, in addition to providing switchable connection of these select signals, the filters of the present invention are able to provide only those signals of interest within a particular beam to the BTS equipment. Such an advantage is not possible with the switch arrays illustrated in FIG. 3.

Preferably the scan receiver of scan receiver and filter controller 480 to determines which filters to activate for a certain channel. For example the scan receiver may scan the signals associated with each antenna beam and determine that a first beam is the best for a first channel and second channel and a second beam is the best for a third channel. It shall be appreciated that the determination as to a best beam for a particular signal may include such considerations as a receive signal strength indicator (RSSI), a signal to noise ratio, a carrier to interference ratio, or the like. Additionally, such a consideration may include considerations such as a beam to utilize for a particular channel so as to minimize interference with another signal, whether operating on a same or different beam or on a same or different channel. Moreover, where signal diversity is utilized at the BTS, a first beam may be selected for a particular signal to be associated with a first radio input and a second beam may be selected for the same signal to be associated with a second, presumably diversity, radio input.

Scan receiver and filter controller 480 may determine which channels to scan and/or which channels to pass to the coupled BTS equipment based on commands intercepted from the BTS scan receiver. Moreover, statistical data for calls on a particular beam, or other historical data, may be utilized by scan receiver and filter controller 480. Likewise, a communication network controller, other cell site, or the MSO may provide information from which scan receiver and filter controller 480 determines the channels containing the signals of interest.

After selecting a particular antenna beam having the desired attributes with respect to a signal, the scan receiver would determine which sector circuit should pass this information to the BTS equipment. Such determinations may be made based on considerations such as the channels serviceable by the BTS equipment coupled to the sector circuit whether the sector circuit is servicing communication channels having frequencies adjacent to the communication channel of this signal or whether antenna beams covering a particular surface area are being serviced by this sector circuit.

Moreover, determinations by the scan receiver of scan receiver and filter controller 480 may be made based on information provided by a communication network controller influencing a neighborhood of BTS sites. These determinations can be used to further reduce interference by eliminating adjacent channel or co-channel interference or limiting the area within which a particular radio, or set of radios, of the BTS equipment are communicating.

Systems providing for the determination of beam assignment as well as network control of a plurality of BTS sites are disclosed in the above referenced co-pending and commonly assigned U.S. Patent applications entitled "SYSTEM AND METHOD FOR CELLULAR BEAM SPECTRUM MANAGEMENT" and "METHOD AND APPARATUS FOR IMPROVED CONTROL OVER CELLULAR SYSTEMS," incorporated herein by reference.

Regardless of how the determinations are made, the scan receiver provides information to the filter controller to cause it to adjust filters associated with particular beams to allow signals to pass to select BTS equipment. In our above example, the scan receiver would instruct the filter controller to adjust filters associated with the first beam to allow the first and second channels to pass. Likewise, the filter controller would adjust a filter associated with the second beam to allow the third channel to pass. Moreover, if the first and second beams were not determined to provide an acceptable signal with respect to any other channels, the filter controller would adjust any remaining filters associated with these beams to pass no signal.

Figure 5:
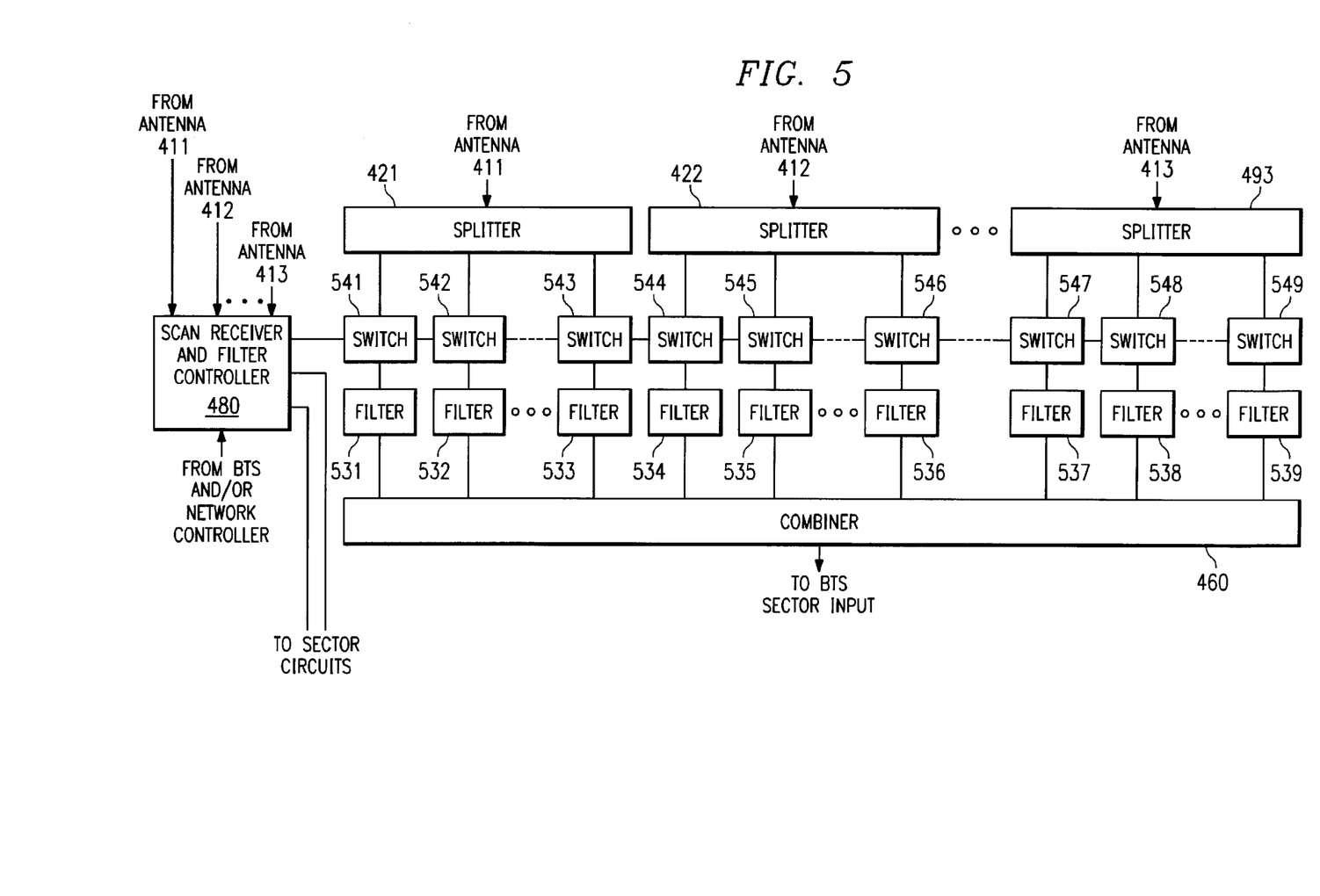
FIG. 5 illustrates an alternative embodiment of a sector circuit of the air interface controller of FIG. 4.

In an alternative embodiment, rather than using adjustable filters to select signals within particular antenna beams to pass to select BTS equipment, switches in combination with fixed filters are used. Referring to FIG. 5, a sector circuit of air interface controller 420 of FIG. 4 is shown utilizing fixed filters 531 through 539 in combination with switches 541 through 549 to provide signals to coupled BTS equipment. Of course, adjustable filters could also be used in combination with the switching illustrated in FIG. 5 where, for example, it is desirable to provide switching means other than by adjusting a filter so as not to pass a signal. Also note that the switch can be built into the filter and need not be a separate device and, similarly, the switch could be after the filter as opposed to before the filter as illustrated.

Although using switches to provide the switchable connection of antenna beam signals to the BTS equipment, this embodiment of the present invention still provides only select signals appearing within a particular beam to the BTS equipment. It shall be appreciated that such an advantage is not possible with the switch array configuration illustrated in FIG. 3.

In this alternative embodiment scan receiver and filter controller 480 control switches rather than adjusting filters. In our example given above, the scan receiver would instruct the filter controller to close switches associated with the first beam coupled to fixed filters adapted to pass the first and second channel in order to allow the first and second channels to pass. Likewise, the filter controller would close a switch associated with the second beam coupled to a fixed filter adapted to pass the third channel in order to allow the third channel to pass. If the first and second beams were not determined to provide an acceptable signal with respect to any other channels, the filter controller would open any remaining switches associated with these beams in order that no other signal passes.

The filtering utilized by the present invention may be by analogue means or, alternatively, digital filtering. It shall be appreciated that the use of digital filtering readily allows the transition from a fixed beam approach to an adaptive array system.

Rather than splitting and filtering analogue communication signals, an alternative embodiment of the present invention utilizes a technique of digitizing the entire band of interest and then manipulating the signals. Directing attention to FIG. 6, a system adapted to provide the advantages of the present invention in the digital domain is shown. Here, air interface controller 620 is embodied in A/D converters 691 through 693, digital signal processor 680, and D/A converters 661 through 663.

Figure 6:
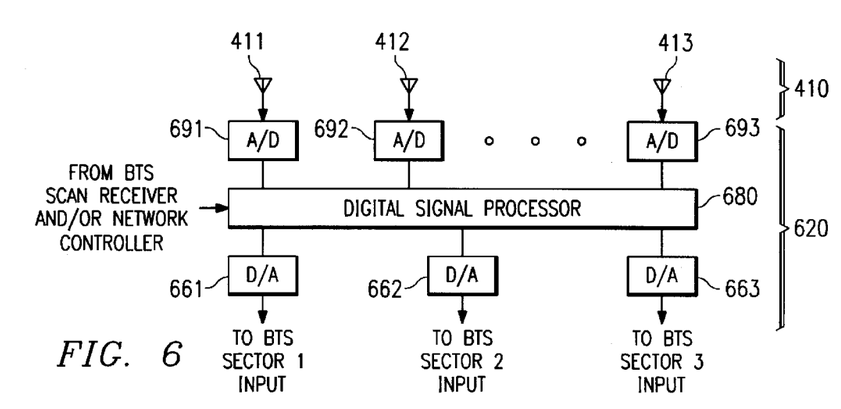
FIG. 6 illustrates a digital embodiment of the air interface controller of the present invention.

Rather than splitting a beam signal for provision to various components of the BTS equipment, each beam signal is converted from analogue to digital by A/D converters 691 through 693 by air interface controller 620. Thereafter, digital signal processor 680 manipulates the signals in the digital domain. Such manipulation may include filtering, interference cancellation, and intelligent decisions such as those performed by the scan receiver and filter controller of the embodiment described above. It shall be appreciated that digital signal processor 680 may be comprised of a central processing unit (CPU), memory (RAM), and an algorithm operable to manipulate the signals as described above.

Once manipulated, digital signal processor 680 provides signals to D/A converters 661 through 663 for conversion from digital to analogue signals and provision to the various inputs of the BTS equipment. Selection of a particular D/A converter is substantially as described above with respect to the scan receiver and filter controller of FIG. 4.

It shall be appreciated that this alternative embodiment of the present invention does not require splitting of the various beam signals, nor does it require the filters of the previous embodiments. Signal duplication and filtration is instead provided digitally as is well known in the art.

Although the embodiments described above are adapted to couple with a multi-sectored BTS, it shall be appreciated that these embodiments are adaptable to other configurations such as the omni-trunk system of FIG. 1. For example, a combiner could be added to combine the sector circuit outputs into a single output for the omni-trunk system. Alternatively, the output of combiner 461 could be coupled to the input 161 of the BTS of FIG. 1 and scan receiver and filter controller 480 instructed to provide signals only to this output. Either arrangement would provide advantages of a multi-beam antenna system, and its associated targeting of particular mobile units, to an existing omni-trunk system. Furthermore, the advantages of filtering and interference cancellation would also be realized, where interference techniques are utilized.

It shall be appreciated that, although a single input is referred to with respect to an omni-trunk system, the present invention may be utilized to provide diverse signals to an omni-trunk system as are discussed above with respect to a sectored system. For example, the outputs of the air interface controller associated with the sector inputs may be combined for one input into the omni-trunk system while the outputs associated with the diversity inputs may be combined for another input into the omni-trunk system. Similarly, a single sector circuit associated with a sector input of the omni-trunk system may be utilized with a single sector circuit associated with a diversity input of the omni-trunk system.

It shall be appreciated that the advantages of the present invention are realizable at the omni-trunk system by the replacing of the omni direction antenna structure of the omni-trunk system and the addition of the inventive air interface controller. As such, the present invention provides an easy to implement applique for a variety of existing BTS systems.

Of course, coupling of the inventive air interface controller to the omni-trunk system utilizing a single sector circuit as described does not utilize all the circuitry available within the air interface controller. Therefore, in a preferred embodiment of the present invention, the splitter, filter, and combiner circuitry associated with each BTS input are provided in modular form. In this embodiment when the air interface controller is to be coupled to a omni-trunk system, or any system with fewer inputs than possible outputs by the air interface controller, the circuitry associated with any unnecessary outputs is simply not included in the installation. For example, when coupled to an omni-trunk system, splitters 424 through 429, filters 440 through 457, and combiners 462 and 463 are not included in the air interface controller.

This modular embodiment of the present invention provides a convenient means by which a single, substantially universal, applique may be provided to service any number of different BTS configurations. Adapting the universal air interface controller requires only its filter controller be instructed as to the number and types (i.e., sector and diversity) of BTS inputs to be serviced in order to be adapted to provide the proper signals thereto.

Although the present invention has been discussed in the context of an appliqué to retrofit existing BTS sites in order to provide improved signal quality, it shall be appreciated that the present invention is useful in deploying new BTS sites as well. The signal quality improvements provided by the present invention along with its use of a multi-beam antenna structure make the present invention desirable for use in new deployments as well as existing system retrofitting.

Although the present invention has been described as providing signals to the BTS equipment, it shall be appreciated that the present invention is equally useful in the reverse direction. For example, the various communications channels, typically combined for transmission within a sector of a sectored system may be each individually filtered and directed to separate antenna beams to provide substantially interference free transmission from the BTS site.

It shall be appreciated that the present invention may provide alarming to a communication network controller or operations center where necessary or advantageous. Such signals may be provided by the scan receiver and filter controller through, for example, the connection linking it with the communication network controller.

Although the present invention and its advantages have been described in detail, it should be understood that various changes, substitutions and alterations can be made herein without departing from the spirit and scope of the invention as defined by the appended claims.

What is claimed is:

1. A system for providing a select communication channel of a plurality of communication channels detectable within a select antenna beam signal of a plurality of narrow antenna beam signals to an interface of a communication device to the exclusion of other communication channels of said plurality of communication channels detectable within said select antenna beam signal, said system comprising:

means for filtering each antenna beam signal of said plurality of narrow antenna beam signals, said filtering means having for each antenna beam signal the ability to selectively pass any communication channel of a predetermined set of communication channels to the exclusion of other communication channels of said predetermined set of communication channels, wherein said plurality of communication channels are associated with a same communication link direction of said communication device; and means for controlling said filtering means, said controlling means monitoring ones of said plurality of narrow antenna beam signals to determine said select antenna beam signal to be utilized to provide said select communication channel;

wherein said system is adapted to couple to a plurality of different configurations of said communication device.

2. The system of claim 1, wherein said determination of said antenna beam signal to be utilized is a function of a communication channel attribute selected from the group consisting of:

a receive signal strength indicator;

a signal to noise ratio; and a carrier to interference ratio.

3. The system of claim 1, wherein said determination of said antenna beam signal to be utilized is a function of historical data with respect to utilization of ones of said plurality of antenna beam signals.

4. The system of claim 1, wherein said communication device interface is selected from a plurality of communication device interfaces, said select communication channel being selectively provided to said select communication device interface by said controlling means allowing said select communication channel to pass a filter of said filtering means associated with said select communication device interface.

5. The system of claim 4, wherein said select communication device interface is an interface associated with a particular set of communication channels as defined at said communication device and said select communication channel is included in said set of communication channels.

6. The system of claim 4, wherein said select communication device interface is associated with another device interface associated with the same particular set of communication channels.

7. The system of claim 1, wherein said controlling means is adapted to accept information provided from an external source regarding said select communication channel.

8. The system of claim 7, wherein said external source is selected from the group consisting of a base transceiver station scan receiver, a remote communication device, a base controller station, a communication network controller, and a mobile switching office.

9. The system of claim 1, wherein said filtering means comprises:

a plurality of adjustable filters associated with each antenna beam signal of said plurality of narrow antenna beam signals, said plurality of adjustable filters being adapted to adjustably pass any communication channel of said set of communication channels.

10. The system of claim 1, wherein said filtering means comprises:

at least one filter associated with each antenna beam signal of said plurality of narrow antenna beam signals adapted to pass a channel of said set of channels; and a switch associated with said at least one filter, said switch being controlled by said controlling means.

11. The system of claim 1, wherein said filtering means comprises:

means for converting an analogue signal associated with each antenna beam signal of said plurality of narrow antenna beam signals to a digital signal;

means for processing each said digital signal to produce a desired digital signal; and means for converting said desired digital signal to an analogue signal including a channel of said set of channels.

12. The system of claim 1, wherein said communication device is a component of a cellular communications network.

13. The system of claim 1, wherein said plurality of narrow antenna beam signals are provided by an antenna system selected from the group of antenna systems comprising:
   a fixed beam multiple beam antenna system; and
   an steerable beam multiple beam antenna system.

14. The system of claim 1, wherein said system is adapted to couple to said communication device utilizing antenna beam signal interfaces previously existing at said communication device and supplanting substantially only an antenna structure.

15. The system of claim 1, further comprising:
   means for canceling communication channel interference on said select communication channel.

16. The system of claim 1, wherein said control means further comprises:
   means for providing an alarm signal to a communication network operations center.

17. A method for providing a select communication channel of a plurality of communication channels detectable within an antenna beam signal to an interface of a communication device adapted to conduct communications via said select communication channel to the exclusion of other communication channels of said plurality of communication channels detectable within said antenna beam signal, said method comprising the steps of:
   filtering said antenna beam signal, said filtering step selectively passing any communication channel of a predetermined set of communication channels to the exclusion of other communication channels of said predetermined set of communication channels wherein said plurality of communication channels are associated with a same communication link direction of said communication device; and
   controlling said filtering step as a function of communication channel information provided by said communication device to pass said select communication channel to the exclusion of other communication channels of said plurality of communication channels, wherein said control step further comprises the step of providing an alarm signal to a communication network operations center.

18. The method of claim 17, wherein said controlling step also controls said filtering step as a function of information provided from a source selected from the group consisting of:
   a base controller station;
   a communication network controller; and
   a mobile switching office.

19. The method of claim 17, wherein said controlling step also controls said filtering step as a function of historical information with respect to utilization of ones of said plurality communication channels.

20. The method of claim 17, wherein said communication device interface is selected from a plurality of communication device interfaces, said select communication channel being selectively provided to said select communication device interface by said controlling step allowing said select communication channel to pass a filter associated with said select communication device interface.

21. The method of claim 20, wherein said select communication device interface is an interface associated with a particular set of communication channels as defined at said communication device and said select communication channel is included in said set of communication channels.

22. The method of claim 17, wherein said filtering step comprises the step of:
   adjusting at least one adjustable filter associated with said antenna beam signal, said at least one adjustable filter being adapted to adjustably pass a communication channel of said set of communication channels.

23. The method of claim 17, wherein said filtering step comprises the step of:
   activating a switch associated with at least one filter adapted to pass a communication channel of said set of communication channels.

24. The method of claim 17, wherein said filtering step comprises the steps of:
   converting an analogue signal associated with said antenna beam signal to a digital signal;
   processing said digital signal to produce a desired digital signal; and
   converting said desired digital signal to an analogue signal.

25. The method of claim 17, wherein said communication device is associated with a cellular communications network.

26. The method of claim 17 wherein said antenna beam signal is selected from a plurality of antenna beam signals.

27. The method of claim 26, wherein said controlling step includes the step of:
   monitoring said antenna beam signal to determine an attribute associated with said select communication channel.

28. The method of claim 28, wherein said attribute is selected from the group consisting of:
   a receive signal strength indicator;
   a signal to noise ratio; and
   a carrier to interference ratio.

29. The method of claim 27, wherein said controlling step also controls said filtering step as a function of historical information with respect to utilization of ones of said plurality of antenna beam signals.

30. The method of claim 27, wherein said antenna beam signal is selected as a function of said monitored attribute.

31. The method of claim 26, wherein said plurality of antenna beam signals are provided by an antenna system selected from the group of antenna systems comprising:
   a fixed beam multiple beam antenna system; and
   an steerable beam multiple beam antenna system.

32. The method of claim 17, further comprising the step of:
   coupling a system to said communication device utilizing antenna beam signal interfaces previously existing at said communication device and supplanting substantially only an antenna structure.

33. The method of claim 17, further comprising the step of:
   canceling communication channel interference on said select communication channel.

34. A system for providing a select communication channel of a plurality of communication channels included within a communication device signal to a select antenna beam of a plurality of antenna beams to the exclusion of other communication channels of said plurality of communication channels, said system comprising:

means for filtering said communication device signal, said filtering means having the ability to selectively pass any communication channel of said plurality of communication channels to each antenna beam; and means for controlling said filtering means, said controlling means monitoring ones of said plurality of antenna beams to determine said select antenna beam to provide said select communication channel, wherein said determination of said select antenna beam is a function of statistical data of use of ones of said plurality of antenna beams.

35. The system of claim 34, wherein said determination of said select antenna beam is a function of a communication channel attribute selected from the group consisting of:

a receive signal strength indicator;

a signal to noise ratio; and a carrier to interference ratio.

36. The system of claim 34, wherein said controlling means is adapted to accept information provided from an external source regarding said select communication channel.

37. The system of claim 36, wherein said external source is selected from the group consisting of a base transceiver station scan receiver, a base controller station, a communication network controller, and a mobile switching office.

38. The system of claim 34, wherein said filtering means comprises:

a plurality of adjustable filters associated with each antenna beam of said plurality of antenna beams, said plurality of adjustable filters being adapted to adjustably pass any communication channel of said plurality of communication channels.

39. The system of claim 34, wherein said filtering means comprises:

at least one filter associated with each antenna beam of said plurality of antenna beams adapted to pass a channel of said plurality of channels; and a switch associated with said at least one filter, said switch being controlled by said controlling means.

40. The system of claim 34, wherein said filtering means comprises:

means for converting said communication device signal to a digital signal;

means for processing said digital signal to produce a desired digital signal including said select communication channel; and means for converting said desired digital signal to an analogue signal associated with said select antenna beam of said plurality of antenna beam.

41. A system for communicating a select communication channel signal between an antenna structure having a plurality of antenna beams associated therewith and a radio apparatus having a plurality of communication channels associated therewith, said system comprising:

first means for splitting a signal associated with each antenna beam of said plurality of antenna beams to provide a plurality of split antenna beam signals associated with each antenna beam, wherein each antenna beam signal of said plurality of antenna beam signals is split into a plurality of split antenna beam signals including the same signal content as said antenna beam signal from which they are split;

second means for splitting ones of said split antenna beam signals to provide a plurality of channel signals associated with said ones of said split antenna beam signals, wherein each split antenna beam signal of said plurality of split antenna beam signals is split into a plurality of channel signals including the same signal content as said split antenna beam signal from which they are split;

means for filtering ones of said channel signals to result in only select communication channels of said plurality of communication channels to remain therein;

means for combining ones of said filtered channel signals to provide combined filtered channel signals associated with a select interface port of said radio apparatus; and means for controlling said filtering means, said controlling means utilizing ones of said split antenna beam signals to ascertain information regarding said communication channels as detectable within ones of said antenna beam signals to determine a particular antenna beam signal of said signals associated with said antenna beams to provide said select communication channel signal through said filtering means to an interface port of said radio apparatus, wherein said determination of said particular antenna beam signal of said signals to provide said selected communication channel signal through said filtering means is a function of statistical data of use of ones of said plurality of antenna beams.

42. The system of claim 41, wherein said controlling means is adapted to accept information provided from an external source regarding a communication channel of said plurality of channels to provide to said radio apparatus.

43. The system of claim 42, wherein said external source is selected from the group consisting of a base transceiver station scan receiver, a base controller station, a communication network controller, and a mobile switching office.

44. The system of claim 41, wherein said filtering means comprises:

a plurality of adjustable filters adapted to adjustably pass at least one channel of said plurality of channels.

45. The system of claim 41, wherein said filtering means comprises:

a plurality of filters adapted to pass at least one channel of said plurality of channels; and means for switchably coupling ones of said plurality of channel signals to ones of said plurality of filters.

46. The system of claim 41, wherein said select interface port of said radio apparatus is an interface port associated with a sector as defined at said radio apparatus.

47. The system of claim 41, wherein said radio apparatus comprises a cellular communications base station.

48. The system of claim 47, wherein said cellular communications base station is previously deployed and said system is adapted to provide a base station applique, said applique coupling to said base station utilizing existing inputs and usurping substantially only an existing antenna structure.

49. The system of claim 48, wherein said appliqué is adapted to couple a plurality of different configurations of base stations.

50. The system of claim 41, further comprising:

means for canceling communication channel interference in said select communication channel signal.

51. An apparatus for adapting a cellular base station to accept multiple antenna beam signals, said apparatus for communicating a select frequency band between select antenna beam signal of said multiple antenna beam signals and a receiver, said apparatus comprising:

a first plurality of signal splitters to provide a plurality of split antenna beam signals associated with each said antenna beam, wherein at least one signal splitter of said first plurality of signal splitters is associated with each antenna beam signal;

a second plurality of signal splitters to provide a plurality of channel signals, wherein at least one splitter of said second plurality of splitters is associated with a split antenna beam signal of each antenna beam signal;

a plurality of filters to provide a filtered channel signal, wherein at least one filter of said plurality of filters is associated with each said channel signal;

a plurality of combiners to combine select ones of said filtered channel signals ones of said filtered channel signals, wherein at least one combiner of said plurality of combiners is associated with an input of said cellular base station;

a controller controlling said plurality of filters, said controller utilizing ones of said split antenna beam signals to ascertain information regarding said select frequency band as detectable within ones of said antenna beam signals to determine said select antenna beam signal to provide to said input of said cellular base station, wherein said controller is adapted to accept information provided from an external source regarding said select frequency band, wherein said determination of said particular antenna beam signal of said signals to provide said selected communication channel signal through said filtering means is a function of statistical data of use of ones of said plurality of antenna beams.

52. The apparatus of claim 51, wherein said external source is selected from the group consisting of a scan receiver, a base controller station, a communication network controller, and a mobile switching office.

53. The apparatus of claim 51, wherein ones of said plurality of filters comprise:

an adjustable filter adapted to adjustably pass at least said select frequency band.

54. The apparatus of claim 51, wherein ones of said filters comprise:

a filter adapted to pass at least said select frequency band; and a switch coupled to said filter.

55. The apparatus of claim 51, wherein said select input of said cellular base station is a sector input as defined at said base station.

56. The method of claim 17, wherein said communication device includes a base transceiver scan receiver.

57. A method for providing a select communication channel of a plurality of communication channels detectable within an antenna beam signal to an interface of a device to the exclusion of other communication channels of said plurality of communication channels detectable within said antenna beam signal, said method comprising the steps of:

filtering said antenna beam signal, said filtering step selectively passing any communication channel of a predetermined set of communication channels to the exclusion of other communication channels of said predetermined set of communication channels, wherein said plurality of communication channels are associated with a same communication link direction of said communication device; and controlling said filtering step to pass said select communication channel to the exclusion of other communication channels of said plurality of communication channels as a function of historical information with respect to utilization of ones of said plurality of communication channels.

58. The method of claim 57, wherein said controlling step also controls said filtering step as a function of communication channel information provided by a source selected from the group consisting of a base transceiver station scan receiver, a base controller station a communication network controller, and a mobile switching office.

59. The method of claim 57, wherein said filtering step comprises the step of:

adjusting at least one adjustable filter associated with said antenna beam signal, said at least one adjustable filter being adapted to adjustably pass a communication channel of said set of communication channels.

60. The method of claim 57, wherein said filtering step comprises the step of:

activating a switch associated with at least one filter adapted to pass a communication channel of said set of communication channels.

61. The method of claim 57, wherein said filtering step comprises the steps of:

converting an analogue signal associated with said antenna beam signal to a digital signal;

processing said digital signal to produce a desired digital signal; and converting said desired digital signal to an analogue signal.

62. The method of claim 57, wherein said antenna beam signal is provided by an antenna system selected from the group of antenna systems comprising:

a fixed beam multiple beam antenna system; and an steerable beam multiple beam antenna system.

63. The system of claim 41, wherein said system is adapted to couple to a plurality of different configurations of said radio apparatus.

64. The apparatus of claim 51, wherein said apparatus is adapted to couple to a plurality of different configurations of said cellular base stations.

65. A system for providing a select communication channel of a plurality of communication channels detectable within a select antenna beam signal of a plurality of narrow antenna beam signals to an interface of a communication device to the exclusion of other communication channels of said plurality of communication channels detectable within said select antenna beam signal, said system comprising:

means for filtering each antenna beam signal of said plurality of narrow antenna beam signals, said filtering means having for each antenna beam signal the ability to selectively pass any communication channel of a predetermined set of communication channels to the exclusion of other communication channels of said predetermined set of communication channels, wherein said plurality of communication channels are associated with a same communication link direction of said communication device; and means for controlling said filtering means, said controlling means monitoring ones of said plurality of narrow antenna beam signals to determine said select antenna beam signal to be utilized to provide said select communication channel, wherein said control means further comprises means for providing an alarm signal to a communication network operations center.

* * * * *